(12) United States Patent
Kim et al.

(10) Patent No.: US 9,262,024 B2
(45) Date of Patent: Feb. 16, 2016

(54) LIQUID CRYSTAL DISPLAY PANEL INCLUDING TOUCH SENSOR AND LIQUID CRYSTAL DISPLAY USING THE SAME

(71) Applicant: LG DISPLAY CO., LTD., Seoul (KR)

(72) Inventors: Taehwan Kim, Gyeonggi-do (KR); Yongchan Park, Seoul (KR); Sangsoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 13/707,850

(22) Filed: Dec. 7, 2012

(65) Prior Publication Data

US 2013/0342770 A1    Dec. 26, 2013

(30) Foreign Application Priority Data

Jun. 20, 2012    (KR) .................... 10-2012-0066308

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01)

(58) Field of Classification Search
CPC ...... G06F 3/044; G06F 3/0412; G06F 3/0416
USPC ........................................ 345/174; 178/18.01
See application file for complete search history.

(56) References Cited

U.S. PATENT DOCUMENTS

| 8,243,043 B2* | 8/2012 | Bytheway | ...................... 345/174 |
| 8,274,488 B2* | 9/2012 | Bae | .............................. 345/173 |
| 8,508,495 B2* | 8/2013 | Hotelling | .............. G06F 3/0412 345/173 |
| 2010/0258360 A1* | 10/2010 | Yilmaz | ...................... 178/18.06 |
| 2011/0048813 A1* | 3/2011 | Yilmaz | ...................... 178/18.06 |
| 2012/0133858 A1* | 5/2012 | Shin et al. | ........................ 349/59 |
| 2012/0162104 A1* | 6/2012 | Chang | ................... G06F 3/0412 345/173 |
| 2012/0218199 A1* | 8/2012 | Kim | ...................... G06F 3/0412 345/173 |
| 2012/0242597 A1* | 9/2012 | Hwang et al. | ................. 345/173 |
| 2013/0015868 A1* | 1/2013 | Peng | ............................. 324/688 |
| 2013/0033439 A1* | 2/2013 | Kim | .................... G02F 1/13338 345/173 |

FOREIGN PATENT DOCUMENTS

| CN | 101866250 A | 10/2010 |
| CN | 102109690 A | 6/2011 |
| KR | 10-2012-0056632 A | 6/2012 |

OTHER PUBLICATIONS

Office Action issued in counterpart Korean Patent Application No. 10-2012-0066308 dated Mar. 30, 2014.
Chinese First Office Action, Chinese Application No. 201210504676.5, Jul. 23, 2015, 15 pages.

* cited by examiner

*Primary Examiner* — Temesgh Ghebretinsae
*Assistant Examiner* — Benyam Ketema
(74) *Attorney, Agent, or Firm* — Fenwick & West LLP

(57) ABSTRACT

According to an aspect of the present invention, a liquid crystal display panel includes a pixel array including data lines through which a data voltage is supplied, gate lines through which a gate pulse is supplied, a plurality of sub-pixels arranged at intersections of the data lines and the gate lines, Tx lines provided with a touch driving signal and connected to Tx electrodes, and Rx lines connected to Rx electrodes, wherein an shield area including an shield pattern to which a voltage at a level different from the data voltage and the touch driving signal is supplied is formed between each of the Tx electrodes and each of the Rx electrodes.

14 Claims, 9 Drawing Sheets

LIQUID CRYSTAL DISPLAY PANEL INCLUDING TOUCH SENSOR AND LIQUID CRYSTAL DISPLAY USING THE SAME

CROSS-REFERENCE TO RELATED APPLICATIONS

This application claims the benefit under 35 U.S.C. §119(a) of Korean Patent Application No. 10-2012-0066308, filed on Jun. 20, 2012, in the Korean Intellectual Property Office, the entire disclosure of which is incorporated by reference herein for all purposes.

BACKGROUND

1. Field

This document relates to a liquid crystal display panel including a touch sensor and a liquid crystal display using the same.

2. Related Art

A user interface (UI) enables communication between a person (user) and various electric and electronic devices such that the user can easily control the electric and electronic devices. Typical examples of the user interface include a keypad, a keyboard, a mouse, an on-screen display (OSD), a remote controller having an infrared or RF communication function, etc. Recently, the user interface has been evolved to a touch UI, a speech recognition UI, etc., which can improve user's emotion and convenience of operation. The touch UI is installed in portable information devices. To implement the touch UI, a touch panel capable of recognizing a user touch is required.

A capacitive touch panel can be applied to various applications because it has durability and visibility of a display image higher than those of a resistive touch panel and can recognize multi-touch and proximity touch. The capacitive touch panel recognizes a touch by applying a touch driving signal to transmitter (Tx) electrodes and then sensing charges generated due to a voltage variation in receiver (Rx) electrodes using mutual capacitance generated between the Tx electrodes and Rx electrodes.

The capacitive touch panel can be implemented as an on-cell type touch panel having capacitance sensors formed on a display panel or an in-cell type including the capacitance sensors formed in a display panel. In the case of the in-cell type, since Tx electrodes are separated from Rx electrodes, liquid crystal electric field for driving sub-pixels overlapped on a Tx electrode is affected by a data voltage supplied through a data line to drive sub-pixels overlapped on an Rx electrode adjacent to the Tx electrode. For example, liquid crystal electric field for driving the sub-pixels overlapped on the Tx electrode is affected by the data voltage supplied through the data line to drive the sub-pixels superposed on the Rx electrode adjacent to the Tx electrode to result in "black gray level light leakage", which cannot represent black gray level even though black gray level voltage is applied.

SUMMARY

The present invention provides a liquid crystal display panel including a touch sensor capable of preventing "black gray level light leakage" and a liquid crystal display using the same.

According to an aspect of the present invention, a liquid crystal display panel includes a pixel array including data lines through which a data voltage is supplied, gate lines through which a gate pulse is supplied, a plurality of sub-pixels arranged at intersections of the data lines and the gate lines, Tx lines provided with a touch driving signal and connected to Tx electrodes, and Rx lines connected to Rx electrodes, wherein an shield area including an shield pattern to which a voltage at a level different from the data voltage and the touch driving signal is supplied is formed between each of the Tx electrodes and each of the Rx electrodes.

According to another aspect of the present invention, a liquid crystal display includes: a liquid crystal display panel including a pixel array including data lines through which a data voltage is supplied, gate lines through which a gate pulse is supplied, a plurality of sub-pixels arranged at intersections of the data lines and the gate lines, Tx lines provided with a touch driving signal and connected to Tx electrodes, and Rx lines connected to Rx electrodes; a data driving circuit configured to supply the data voltage to the data lines; and a gate driving circuit configured to sequentially supply the gate pulse to the gate lines, wherein an shield area including an shield pattern to which a voltage at a level different from the data voltage and the touch driving signal is supplied is formed between each of the Tx electrodes and each of the Rx electrodes.

The features and advantages described in this summary and the following detailed description are not intended to be limiting. Many additional features and advantages will be apparent to one of ordinary skill in the art in view of the drawings, specification and claims.

DETAILED DESCRIPTION OF THE EMBODIMENTS

Figure 1:
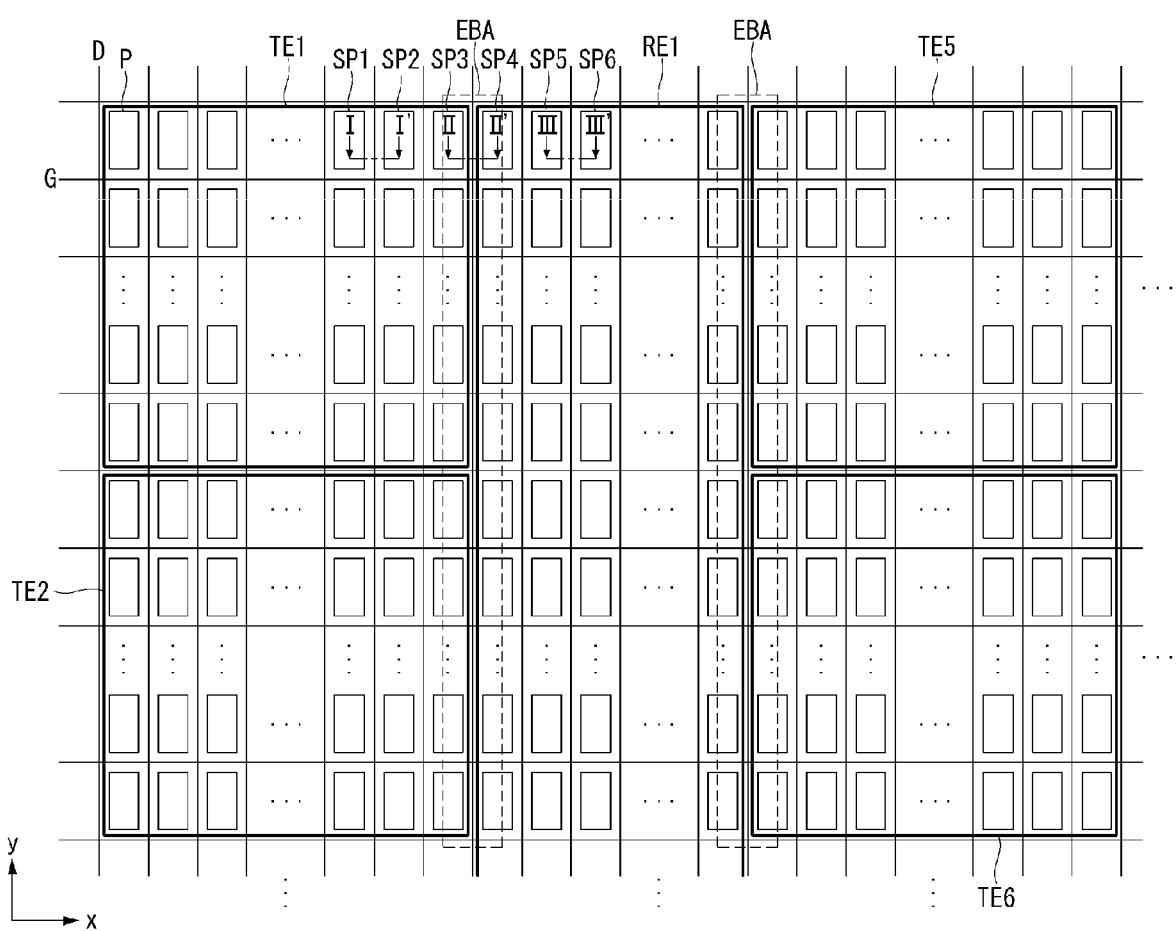
FIG. 1 shows the structure of a liquid crystal display panel according to a first embodiment of the present invention.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 2:
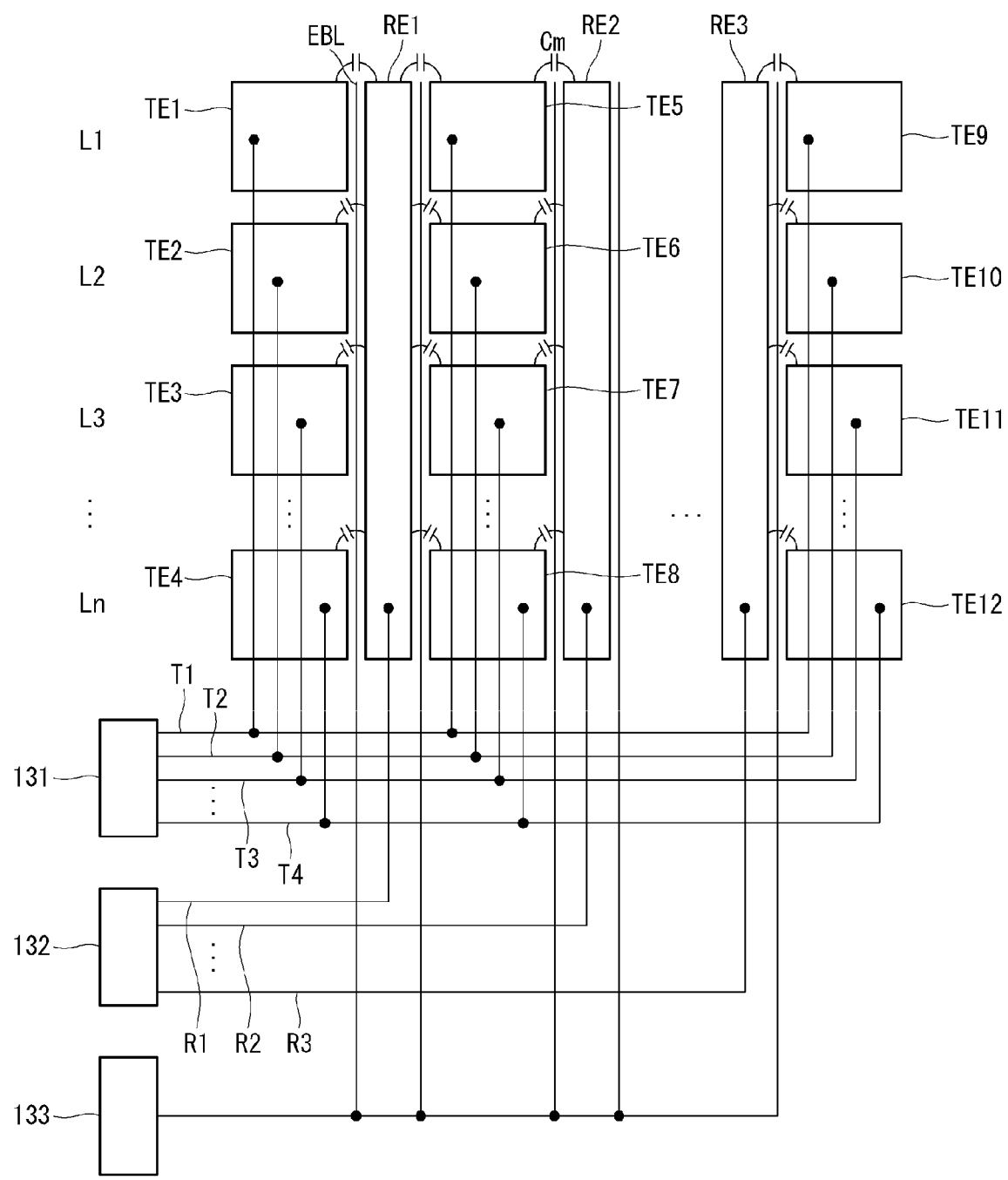
FIG. 2 shows Tx electrodes, Rx electrodes, Tx lines, Rx lines and shield patterns according to the first embodiment of the present invention.

FIG. 1 shows the structure of a liquid crystal display panel according to a first embodiment of the present invention. FIG. 2 shows Tx electrodes, Rx electrodes, Tx lines, Rx lines and shield patterns according to the first embodiment of the present invention. FIG. 1 is an enlarged view showing a first Tx electrode TE1, a second Tx electrode TE2, a first Rx electrode RE1, a fifth Tx electrode TE5 and a sixth Tx electrode TE6 of FIG. 2.

Referring to FIGS. 1 and 2, the liquid crystal display panel according to the first embodiment includes a pixel array in which data lines D, gate lines G, Tx lines T1 to T4 connected to the Tx electrodes, Rx lines R1, R2 and R3 connected to the Rx electrodes and shield patterns EBL are formed. Each of the shield patterns is formed as a metal line. The data lines D are formed in a y-axis direction and the gate lines G are formed in an x-axis direction on a lower substrate of the liquid crystal display panel. A plurality of sub-pixels P are respectively arranged at intersections of the data lines D and the gate lines G in a matrix form. A pixel electrode of each sub-pixel P is connected to a thin film transistor. The thin film transistor supplies a data voltage of the data line D to the pixel electrode in response to a gate pulse of the gate line G. Each sub-pixel P drives liquid crystal of a liquid crystal layer according to a voltage difference between pixel electrode and Tx electrode or a voltage difference between pixel electrode and Rx electrode to control the amount of transmitting light, thereby displaying an image. An upper substrate of the liquid crystal display panel includes a black matrix and color filters formed thereon. The liquid crystal display panel includes the liquid crystal layer between the lower substrate and the upper substrate.

Each of the Tx electrodes TE1 to TE12 may be formed such that the Tx electrode is overlapped on a plurality of sub-pixels. For example, each of the Tx electrodes TE1 to TE12 can be overlapped on p×q (p and q being natural numbers) sub-pixels. Each of Rx electrodes RE1, R2 and RE3 may be formed such that they are overlapped on a plurality of other sub-pixels. For example, each of the Rx electrodes RE1, R2 and RE3 can be overlapped on r×s (r and s being natural numbers) sub-pixels. One of the Tx electrodes TE1 to TE12 neighbors another Tx electrode in the data line direction (y-axis direction). For example, the first Tx electrode TE1 neighbors the second Tx electrode TE2 in the data line direction (y-axis direction). One of the Tx electrodes TE1 to TE12 neighbors one of the Rx electrodes in the gate line direction (x-axis direction). For example, the first Tx electrode TE1 neighbors the first Rx electrode RE1 in the gate line direction (x-axis direction).

A Tx driving circuit 131 is connected to the Tx electrodes TE1 to TE12 through the Tx lines T1 to T4. Specifically, a k-th (k being a natural number) Tx line Tk is connected only to Tx electrodes arranged in a k-th line Lk. For example, the first Tx line T1 is connected to the first, fifth and ninth Tx electrodes TE1, TE5 and TE9 arranged in the first line L1. The second Tx line T2 is connected to the second, sixth and tenth Tx electrodes TE2, TE6 and TE10 arranged in the second line L2. A Rx driving circuit 132 is connected to the Rx electrodes RE1, RE2 and RE3 through the Rx lines R1 to R3. Specifically, a j-th (j being a natural number) Rx line Rj is connected only to a j-th Rx electrode REj. For example, the first Rx line R1 is connected to only the first Rx electrode RE1, and the second Rx line R2 is connected only to the second Rx electrode RE2. The Tx lines T1 to T4 and the Rx lines R1, RE2 and R3 are formed in parallel and arranged in parallel with the data lines.

A touch sensor Cm for sensing touch is formed between each of the Tx electrodes TE1 to TE12 and each of the Rx electrodes RE1 to RE3. The touch sensor Cm can be formed as a mutual capacitance.

An shield area EBA including an shield pattern EBL is formed between each of the Tx electrodes TE1 to TE12 and each of the Rx electrodes RE1 to RE3. The shield pattern prevents the data line and the Tx electrode or the Rx electrode from making an electric field therebetween. The shield pattern EBL receives a predetermined voltage from an shield voltage supply circuit 133. The predetermined voltage has a level different from the data voltage supplied through the data lines and touch driving signals supplied through the Tx lines. For example, the predetermined voltage can be a common voltage. The common voltage can be supplied to the shield pattern EBL as a DC or AC voltage. The common voltage may be applied to the shield pattern EBL as a DC voltage in a dot inversion scheme and a column inversion driving scheme and applied to the shield pattern EBL as an AC voltage in a line inversion scheme.

The shield pattern EBL is insulated from the gate lines G, data lines D, sub-pixels P, Tx lines T1 to T4 and Rx lines R1 to R3. That is, it is noted that the shield pattern EBL is connected to none of the gate lines G, data lines D, sub-pixels P, Tx lines T1 to T4 and Rx lines R1 to R3.

As described above, the present invention forms the shield pattern EBL to which the predetermined voltage is supplied between each of the Tx electrodes TE1 to TE12 and each of the Rx electrodes RE1 to RE3. Consequently, the present invention can prevent liquid crystal electric field for driving a third sub-pixel SP3 adjacently located in the shield pattern EBL and liquid crystal electric field for driving a fourth sub-pixel SP4 adjacently located in the shield pattern EBL, as shown in FIG. 1, from being affected by a data voltage supplied through a data line. Accordingly, the present invention can prevent "black gray level light leakage" generated in sub-pixels formed at boundaries of each Tx electrode and each Rx electrode.

Cross sections of first and second sub-pixels SP1 and SP2 which are not located in the shield area EBA will now be described with reference to FIG. 2 and cross sections of the third and fourth sub-pixels SP3 and SP4 which are located in the shield area EBA will now be described with reference to FIG. 3.

Figure 3:
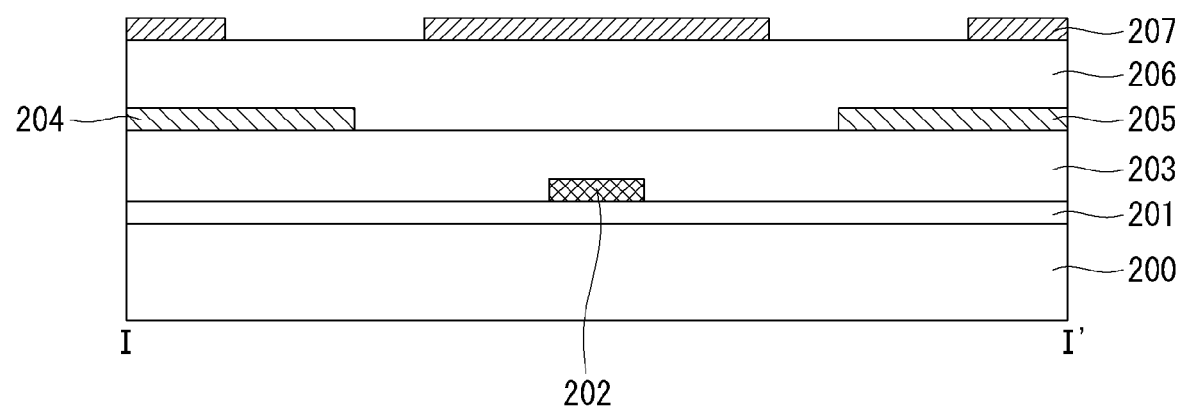
FIG. 3 is a cross-sectional view taken along line I-I' of FIG. 1.

FIG. 3 is a cross-sectional view taken along line I-I' of FIG. 1. Referring to FIG. 3, parts of the first and second sub-pixels SP1 and SP2 overlapped on the first Tx electrode TE1 of FIG. 1 are shown. FIG. 2 shows only a lower substrate 200 for convenience of description.

A gate pattern including a gate electrode and a gate line is formed on the lower substrate 200. A gate insulating layer 201 is formed on the lower substrate 200 and the gate pattern. A source/drain pattern including source/drain electrodes and a data line 202 is formed on the gate insulating layer 201. A first passivation layer 203 is formed on the gate insulating layer 201 and the source/drain pattern. The first passivation layer 203 may include a photo acryl layer. Branch electrodes 204 of a first pixel electrode of the first sub-pixel SP1 and branch electrodes 205 of a second pixel electrode of the second sub-pixel SP2 are formed on the first passivation layer 203. A second passivation layer 206 is formed on the first passivation layer 203, the first pixel electrode 204 and the second electrode layer 205. Branch electrodes 207 of the first Tx electrode are formed on the second passivation layer 206.

It is noted that FIG. 3 shows the liquid crystal display panel operating in the in-plane switching (IPS) mode. In the IPS mode, each Tx electrode and each Rx electrode can be a formed in a slit shape composed of a plurality of branch electrodes. In addition, each pixel electrode can also be formed in a slit shape including a plurality of branch electrodes. That is, each of the Tx electrodes, Rx electrodes and pixel electrodes can include branch electrodes arranged in parallel at a predetermined interval in the IPS mode. Branch electrodes of each Tx electrode and branch electrodes of each Rx electrode form horizontal electric field with branch electrodes of each pixel electrode in the IPS mode. For example, the branch electrodes 207 of the first Tx electrode form horizontal electric field with the branch electrodes 205 of the first pixel electrode and the branch electrodes 204, 205 of the second pixel electrode.

Fifth and sixth sub-pixels SP5 and SP6 overlapped on the first Rx electrode RE1 may have the same cross sections as those of the first and second sub-pixels SP1 and SP2 overlapped on the first Tx electrode TE1. Accordingly, the cross-sectional view taken along line III-III' of FIG. 1 corresponds to the cross-sectional view taken along line I-I' of FIG. 1 so that explanation thereof is omitted.

Figure 4:
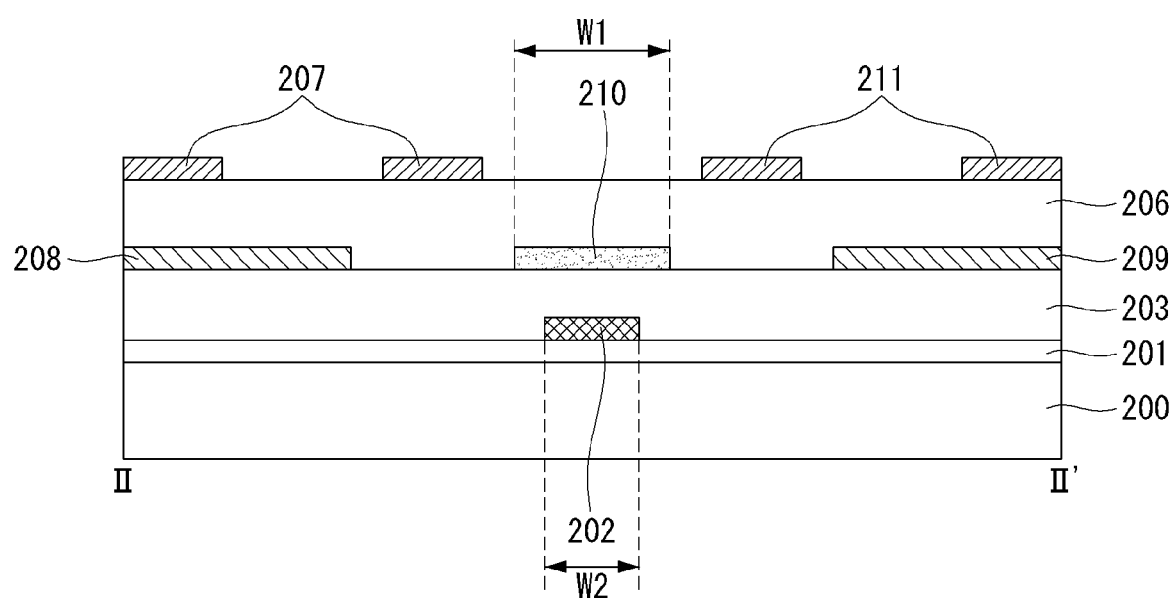
FIG. 4 is a cross-sectional view taken along line II-II' of FIG. 1.

FIG. 4 is a cross-sectional view taken II-II' of FIG. 1. Referring to FIG. 4, the cross sections of the third and fourth sub-pixels SP3 and SP4 adjacently located in the shield pattern 210 are shown. Particularly, FIG. 4 shows the cross sections of the third sub-pixel SP3 overlapped on the first Tx electrode TE1 and the fourth sub-pixel SP4 overlapped on the first Rx electrode RE1. It is noted that FIG. 4 shows only the lower substrate 200 for convenience of description.

The gate pattern including the gate electrode and the gate line is formed on the lower substrate 200. The gate insulating layer 201 is formed on the lower substrate 200 and the gate pattern. The source/drain pattern including the source/drain electrodes and the data line 202 is formed on the gate insulating layer 201. The first passivation layer 203 is formed on the gate insulating layer 201 and the source/drain pattern. The first passivation layer 203 may include a photo acryl layer. Branch electrodes 208 of a third pixel electrode of the third sub-pixel SP3, branch electrodes 209 of a fourth pixel electrode of the fourth sub-pixel S42, and an shield pattern 210 are formed on the first passivation layer 203. Tx lines (not shown) and Rx lines (not shown) may be formed on the first passivation layer 203. That is, the shield pattern 210 and the pixel electrodes are formed on the same plane. Furthermore, the shield pattern 210 and the Tx lines (not shown) and Rx lines (not shown) are formed on the same plane. The shield pattern 210 and the data line 202 are formed on different planes such that the shield pattern is overlapped on the data line 202. The width W1 of the shield pattern 210 may correspond to the width W2 of the data line 202 or greater than the width W2 of the data line 202 as shown in FIG. 4. The shield pattern 210 may be formed of a metal different from the gate pattern and the source/drain pattern.

The second passivation layer 206 is formed on the first passivation layer 203, the branch electrodes 208 of the third pixel electrode, the branch electrodes 209 of the fourth pixel electrode and the shield pattern 210. The branch electrodes 207 of the first Tx electrode TE1 and branch electrodes 211 of the first Rx electrode RE1 are formed on the second passivation layer 206. Since the first Tx electrode TE1 and the first Tx line T1 are formed on different planes, the first Tx electrode TE1 can be connected to the first Tx line T1 through a contact hole that penetrates the second passivation layer 206. The first Rx electrode RE1 can be connected to the first Rx line R1 through a contact hole that penetrates the second passivation layer 206 because the first Tx electrode TE1 and the first Rx line R1 are formed on different planes. It is noted that FIG. 4 shows liquid crystal display panel driven as the IPS mode.

As described above, the present invention forms the shield pattern EBL to which a predetermined voltage is supplied between a Tx electrode and an Rx electrode. If the shield pattern EBL is not provided, electric field between the branch electrodes 208 of the third pixel electrode and the branch electrodes 207 of the data line 202 and electric field between the branch electrodes 209 of the fourth pixel electrode and the branch electrodes 211 of the first Rx electrode RE1 are affected by the data voltage of the data line 202. However, the present invention can prevent the data voltage supplied through the data line from affecting liquid crystal electric field for driving the third sub-pixel SP3 and liquid crystal electric field for driving the fourth sub-pixel SP4 by forming the shield pattern EBL that blocks the data voltage of the data line 202. Therefore, the present invention can prevent "black gray level light leakage" from being generated in sub-pixels formed at boundaries of each Tx electrode and each Rx electrode.

Other sub-pixels adjacently located in the shield pattern EBL can have the same cross sections as those of the sub-pixels SP3 and SP4.

Figure 5:
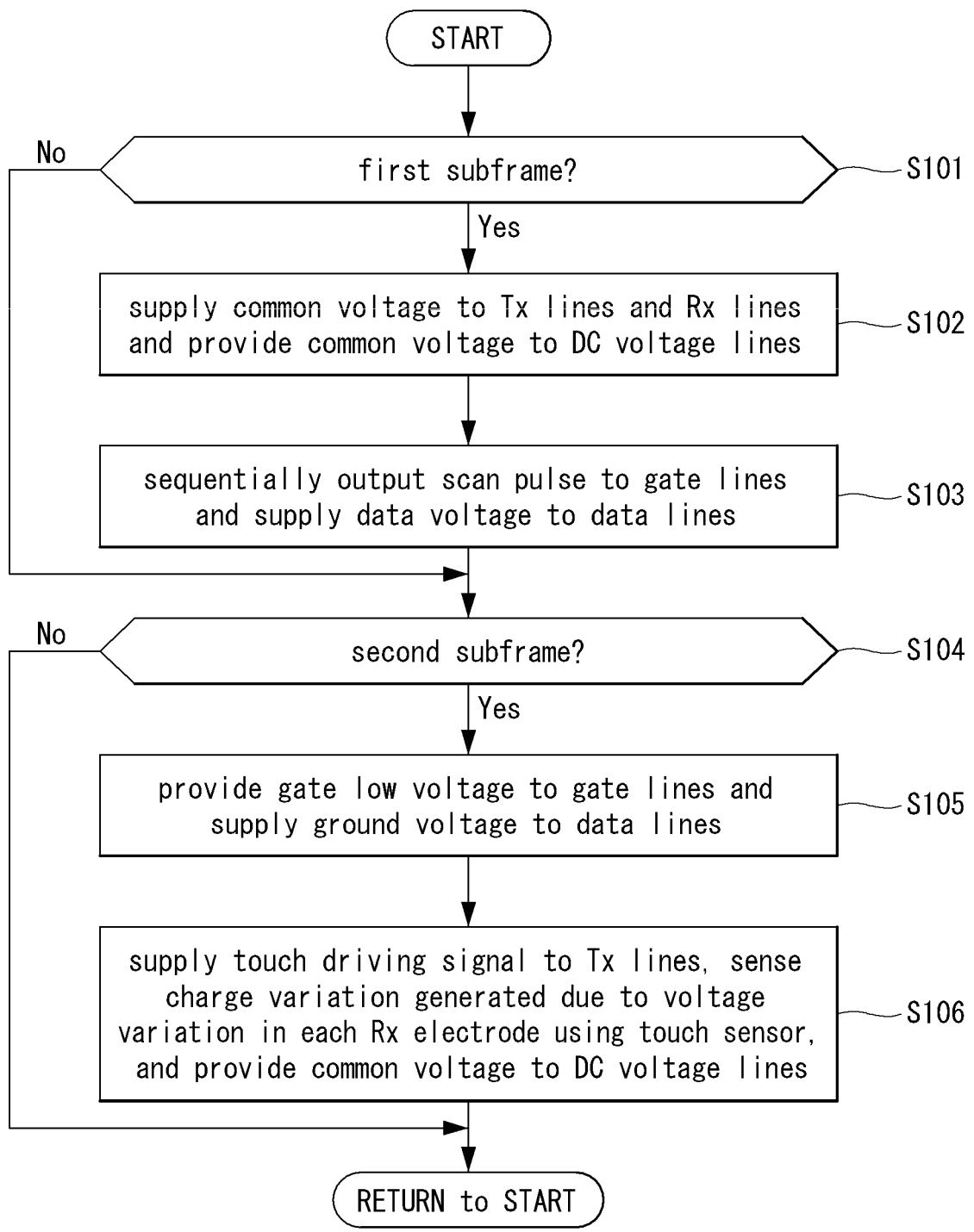
FIG. 5 is a flowchart illustrating a method for driving the liquid crystal display panel according to the first embodiment of the present invention.
Figure 6:
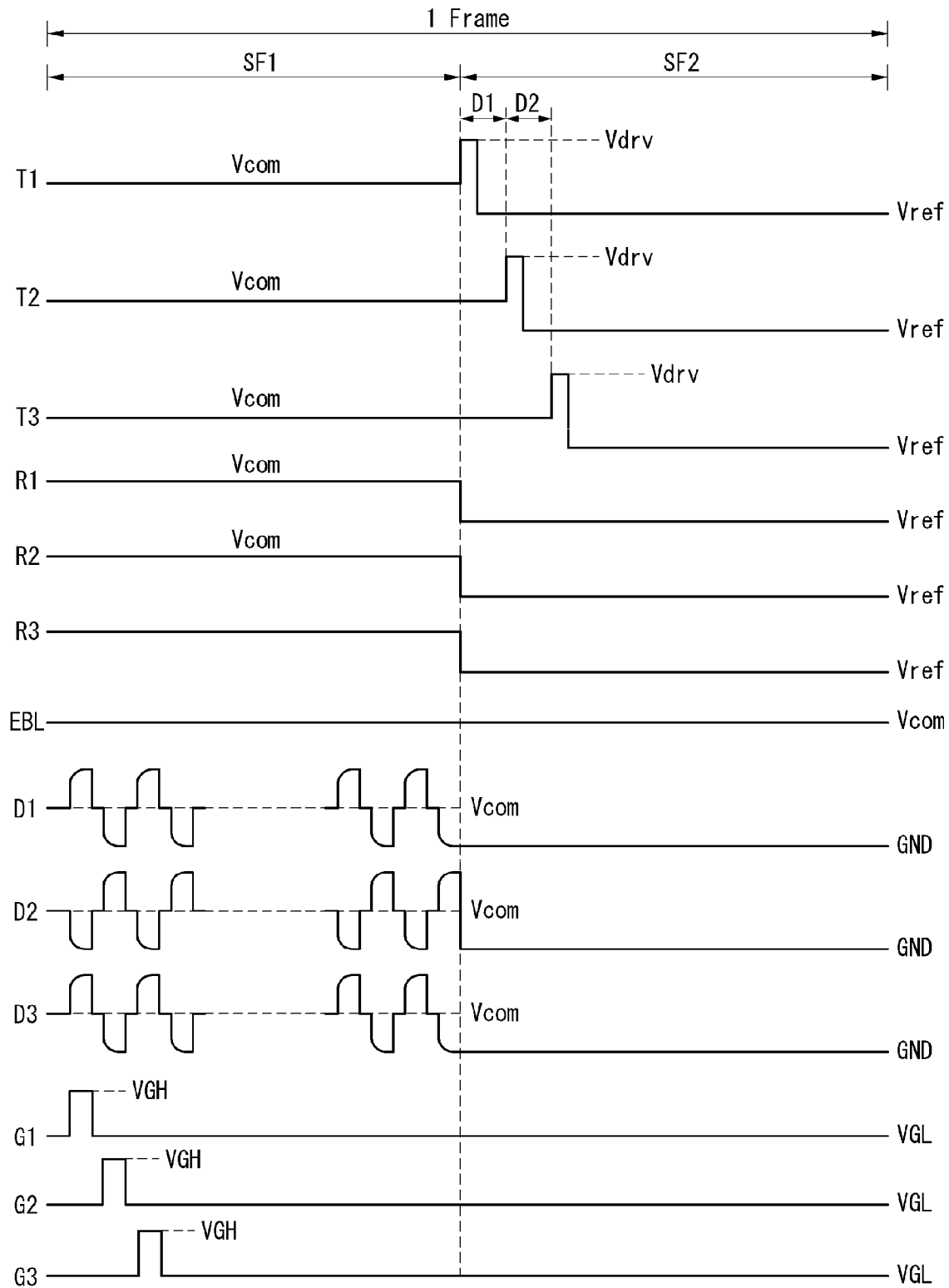
FIG. 6 is a waveform diagram showing voltages supplied to the Tx lines, Rx lines, gate lines, data lines and shield patterns according to the first embodiment of the present invention.

FIG. 5 is a flowchart illustrating a method for driving the liquid crystal display panel according to the first embodiment of the present invention and FIG. 6 is a waveform diagram showing voltages supplied to the Tx lines, Rx lines, gate lines, data lines and shield pattern according to the first embodiment of the present invention. An operating method of the liquid crystal display panel will now be described in detail with reference to FIGS. 2, 5 and 6.

Referring to FIGS. 2, 5 and 6, one frame can be divided into a first subframe SF1 corresponding to a data addressing period and a second subframe SF2 corresponding to a touch sensing period. Specifically, the first subframe SF1 is a period in which the data voltage is supplied to the sub-pixels P so that the sub-pixels P display an image. The second subframe SF2 is a period in which a touch is sensed by supplying touch driving signals to the Tx electrodes TE1 to TE12 and receiving voltages of the touch sensors Cm formed between Tx electrodes and Rx electrodes. The touch sensor Cm may be a mutual capacitance.

Operations of the liquid crystal display panel in steps S101 to S103 of FIG. 5 are described in detail. The Tx driving circuit 131 supplies a common voltage Vcom through the Tx lines T1 to T4 during the first subframe SF1. The Rx driving circuit 132 provides the common voltage Vcom through the Rx lines R1 to R3 during the first subframe SF1. Accordingly, the Tx electrodes TE1 to TE12 and the Rx electrodes RE1 to RE3 function as a common electrode during the first subframe SF1. The shield voltage supply circuit 133 supplies the common voltage Vcom to the shield pattern EBL during the first subframe SF1.

A gate driving circuit sequentially supplies a scan pulse to the gate lines G1 to G3 during the first subframe SF1. The scan pulse may be generated as a gate high voltage VGH. A data driving circuit provides data voltages to the data lines D1 to D3 during the first subframe SF1. While FIG. 6 illustrates that the data driving circuit alternately supplies a positive data voltage and a negative data voltage in a predetermined horizontal period, the present invention is not limited thereto. One horizontal period refers to one line scanning period during which the data voltages are supplied to sub-pixels corresponding to one horizontal line. It is noted that the data driving circuit can supply the data voltages using a method different from the method shown in FIG. 6 according to the layout of the sub-pixels and data lines. That is, the pixel electrode of each sub-pixel P charges the data voltage and each sub-pixel P adjusts the amount of transmitting light by driving liquid crystal of the liquid crystal layer according to a voltage difference between each pixel electrode and each Tx electrode or a voltage difference between each pixel electrode and each Rx electrode, thereby displaying an image (S101, S102 and S103 in FIG. 5).

Operations of the liquid crystal display panel in steps S104 to S106 will now be described in detail. The gate driving circuit supplies a gate low voltage VGL to the gate lines G1, G2 and G3 during the second subframe SF2. The gate low voltage VGL is lower than the gate high voltage VGH. The data driving circuit provides a ground voltage GND to the data lines D1, D2 and D3 during the second subframe SF2. The ground voltage GND is lower than the common voltage Vcom. The data driving circuit may supply the common voltage Vcom to the data lines D1, D2 and D3 during the second subframe SF2. Accordingly, the pixel electrodes of the sub-pixels P maintain the data voltage charged therein for the first subframe SF1. The electric field voltage supply circuit 133 supplies the common voltage to the shield pattern EBL during the first subframe SF1.

The Tx driving circuit 131 sequentially supplies a touch driving signal Vdrv through the Tx lines T1 to T4 during the second subframe SF2. For example, the Tx driving circuit 131 supplies the touch driving signal Vdrv to the first Tx line T1, and then provides the touch driving signal Vdrv to the second Tx line T2. Subsequently, the Tx driving circuit 131 supplies the touch driving signal Vdrv to the third Tx line T3. Accordingly, the touch driving signal Vdrv is simultaneously supplied to the Tx electrodes arranged on the same horizontal line. For example, the touch driving signal Vdrv is simultaneously provided to the first Tx electrode TE1, the fifth Tx electrode TE5 and the ninth touch electrode TE9 of the first Tx line T1 during a first period D1 and the touch driving signal Vdrv is simultaneously provided to the second Tx electrode TE2, the sixth Tx electrode TE6 and the tenth touch electrode TE10 of the second line L2 during a second period D2.

The Rx driving circuit 132 maintains the Rx lines R1, R2 and R3 at a reference voltage Vref during the second subframe SF2. The reference voltage Vref may be set to a level equal to or lower than the common voltage Vcom. Since the Rx electrodes RE1, RE2 and RE3 are affected by the touch driving signal Vdrv due to mutual capacitance between each Tx electrode and each Rx electrode, voltage variation occurs in the Rx electrodes RE1, RE2 and RE3. The Rx driving circuit 132 senses a charge variation caused by the voltage variation in the Rx electrodes RE1, RE2 and RE3. The Rx driving circuit 132 converts the charge variation sensed by the Rx driving circuit 132 into touch raw data corresponding to digital data and outputs the touch raw data to the controller 140 (S104, S105 and S106).

Figure 7:
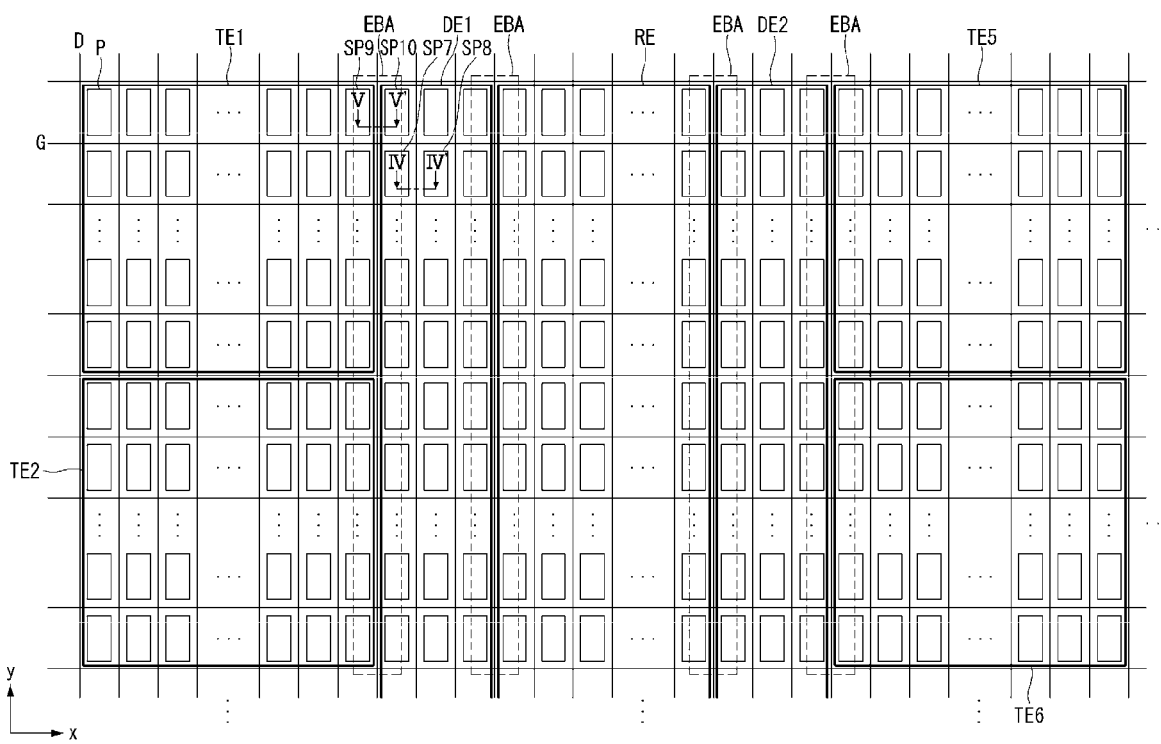
FIG. 7 shows the structure of a liquid crystal display panel according to a second embodiment of the present invention.
Figure 8:
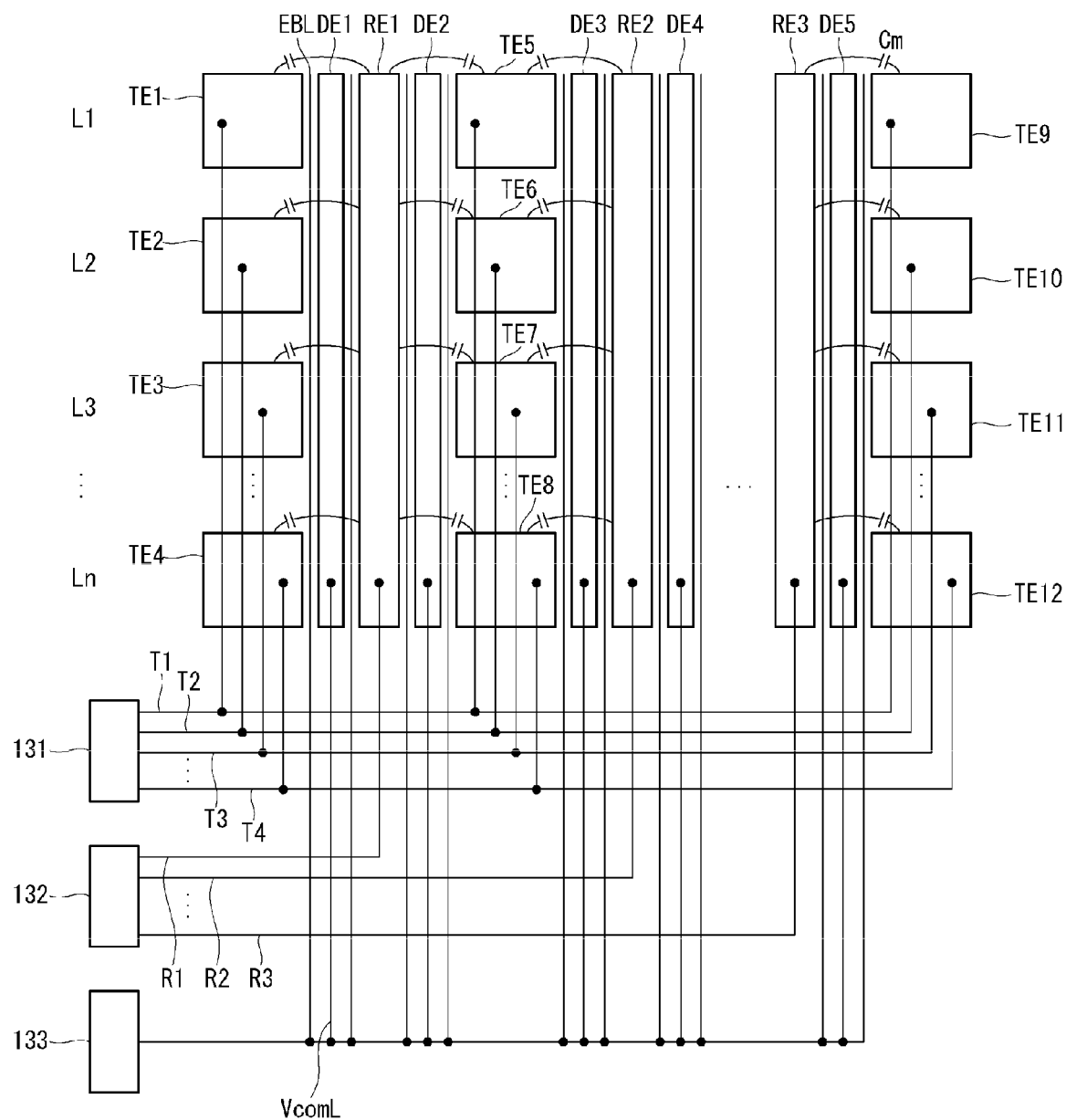
FIG. 8 shows Tx electrodes, Rx electrodes, Tx lines, Rx lines and shield patterns according to the second embodiment of the present invention.

FIG. 7 shows the structure of a liquid crystal display panel according to a second embodiment of the present invention and FIG. 8 is a block diagram illustrating Tx electrodes, Rx electrodes, Tx lines, Rx lines and shield patterns according to the second embodiment of the present invention. Referring to FIGS. 7 and 8, the liquid crystal display panel according to the second embodiment of the invention corresponds to the liquid crystal display panel according to the first embodiment of the invention except that an auxiliary electrode is formed between each of the Tx electrodes TE1 to TE12 and each of the Rx electrodes RE1, RE2 and RE3. Accordingly, explanation of the same parts as those of the liquid crystal display panel according to the first embodiment of the invention is omitted.

The liquid crystal display panel according to the second embodiment of the invention includes an auxiliary electrode formed between each of the Tx electrodes TE1 to TE12 and each of the Rx electrodes RE1, RE2 and RE3. The common voltage is supplied to auxiliary electrodes DE1 to DE4. In the second embodiment of the invention, an shield area EBA including an shield pattern EBL is formed between each of the Tx electrodes TE1 to TE12 and each of the auxiliary electrodes DE1 to DE4 and an shield area EBA including an shield pattern EBL is formed between each of the Rx electrodes RE1, RE2 and RE3 and each of the auxiliary electrodes DE1 to DE4.

Each of the Tx electrodes TE1 to TE12 may be overlapped on a plurality of sub-pixels. Each of the Rx electrodes RE1, RE2 and RE3 may be overlapped on a plurality of other sub-pixels. For example, each of the auxiliary electrodes DE1 to DE4 can be overlapped on t×s (t being a natural number) sub-pixels. Each of the auxiliary electrodes DE1 to DE4 can be formed having a size corresponding to 3×s sub-pixels. The auxiliary electrodes DE1 to DE4 are formed on the same plane on which the Tx electrodes TE1 to TE12 and the Rx electrodes RE1, RE2 and RE3 are formed.

Each of the auxiliary electrodes DE1 to DE4 neighbors a plurality of Tx electrodes or an Rx electrode in the gate line direction (x-axis direction). For example, the first auxiliary electrode DE1 neighbors the first to fourth Tx electrodes TE1 to TE4 in the gate line direction (x-axis direction). Furthermore, the first auxiliary electrode DE1 neighbors the first Rx electrode RE1 in the gate line direction (x-axis direction).

Cross sections (IV-IV') of seventh and eighth sub-pixels SP7 and SP8 overlapped on the first auxiliary electrode DE1 may correspond to the cross sections (I-I') of the first and second sub-pixels SP1 and SP2 overlapped on the first Tx electrode TE1, shown in FIG. 2. Cross sections (V-V') of a ninth sub-pixel SP9 overlapped on the first Tx electrode TE1 and a tenth sub-pixel SP10 overlapped on the first auxiliary electrode DE1 may correspond to the cross sections (II-II') of the third and fourth sub-pixels SP3 and SP4 of the shield area EBA shown in FIG. 3. A sub-pixel overlapped on the first auxiliary electrode DE1 and a sub-pixel overlapped on the first Rx electrode RE1 may have the same cross sections as those (II-II') of the third and fourth sub-pixels SP3 and SP4 of the shield area EBA shown in FIG. 3.

As described above, according to the second embodiment of the present invention, the auxiliary electrode is be formed between each Tx electrode and each Rx electrode such that sufficient field can be generated between each touch sensor and each Tx electrode or each Rx electrode. Sufficient field can be formed when each touch sensor is located at a sufficient distance from each of the Tx electrodes TE1 to TE12 or each of the Rx electrodes RE1, RE2 and RE3.

Figure 9:
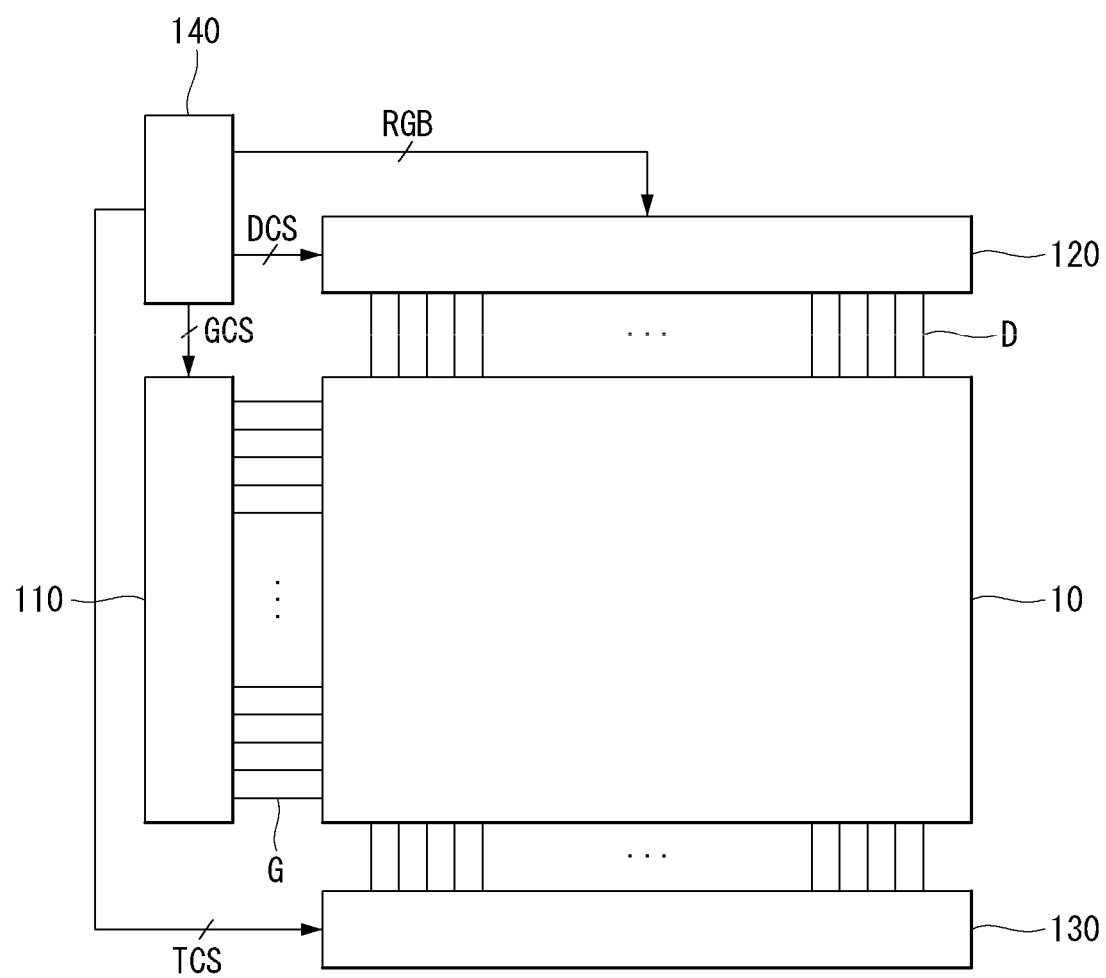
FIG. 9 is a block diagram of a liquid crystal display according to an embodiment of the present invention.

FIG. 9 is a block diagram showing a liquid crystal display according to an embodiment of the present invention. Referring to FIG. 9, the liquid crystal display includes a liquid crystal display panel 10, a gate driving circuit 110, a data driving circuit 120, a touch driving circuit 130, and a controller 140.

The liquid crystal display panel includes a pixel array in which data lines D, gate lines G, Tx lines, Rx lines, and shield patterns are arranged. A plurality of sub-pixels P are respectively arranged at intersections of the data lines D and the gate lines G in a matrix form. A pixel electrode of each sub-pixel P is connected to a thin film transistor. The thin film transistor supplies a data voltage of the data lines D to the pixel electrode in response to a gate pulse of the gate lines G. Each sub-pixel P adjusts the amount of transmitting light by driving liquid crystal of a liquid crystal layer according to a voltage difference between the pixel electrode and a corresponding Tx electrode or a voltage difference between the pixel electrode and a corresponding Tx electrode, to thereby display an image. The upper substrate of the liquid crystal display panel includes a black matrix and color filters formed thereon. The liquid crystal layer is formed between the lower substrate and the upper substrate of the liquid crystal display panel. The detailed structure of the liquid crystal display panel has been described above with reference to FIGS. 1, 2, 3, 4, 7 and 8.

The Tx electrodes, Rx electrodes and auxiliary electrodes function as a common electrode during the first subframe. In the embodiments of the present invention, the Tx electrodes, Rx electrodes and auxiliary electrodes are formed on the lower substrate with the pixel electrodes as the in-plane switching mode. In this case, the liquid crystal display panel 10 can be implemented as a horizontal electric field driven the liquid crystal display panel such as an IPS mode or FFS (Fringe Field Switching) mode. A polarizer is attached to each of the upper substrate and the lower substrate of the liquid crystal display panel and an alignment film for setting a pre-tilt angle of the liquid crystal is formed thereon.

The liquid crystal display of the present invention can be implemented as any of a transmissive liquid crystal display, a transflective liquid crystal display, a reflective liquid crystal, etc. The transmissive liquid crystal display and the reflective liquid crystal display require a backlight unit. The backlight unit can be implemented as a direct type or edge type backlight unit.

The gate driving circuit 110 receives a gate timing control signal GCS from the controller 140. The gate driving circuit 110 sequentially supplies a gate pulse (or scan pulse) to the gate lines G in response to the gate timing control signal GCS during the first subframe SF1. The gate driving circuit 110 provides a gate low voltage VGL to the gate lines G during the second subframe SF2. The operation of the gate driving circuit 100 has been described in detail with reference to FIGS. 5 and 6.

The data driving circuit 120 includes a plurality of source drive ICs. The source drive ICs receive digital video data RGB and a source timing control signal DCS from the controller 140. The source drive ICs convert the digital video data RGB into positive and negative data voltages and supply the positive and negative data voltages to the data lines D in response to the source timing control signal DCS during the first subframe SF1. The source drive ICs provide the ground voltage GND or the common voltage to the data lines D during the second subframe SF2. The operation of the data driving circuit 120 has been described in detail with reference to FIGS. 5 and 6.

The touch driving circuit 130 includes the Tx driving circuit 131, the Rx driving circuit 132, and the shield voltage supply circuit 133. The touch driving circuit 130 controls operation timing of the Tx driving circuit 131 and the Rx driving circuit 132 according to a touch control signal TCS of the controller 140. The Tx driving circuit 131 supplies the common voltage to the Tx lines during the first subframe SF1 and sequentially provides a touch driving pulse to the Tx lines during the second subframe SF2. The Rx driving circuit 132 supplies the common voltage to the Rx lines during the first subframe SF1 and provides a reference voltage to the Rx lines during the second subframe SF2. The shield voltage supply circuit 133 provides the common voltage as a DC voltage to common voltage lines. The Tx driving circuit 131, the Rx driving circuit 132 and the shield voltage supply circuit 133 have been described in detail with reference to FIGS. 2, 5 and 6.

The controller 140 controls operation timing of the gate driving circuit 110, the data driving circuit 120 and the touch driving circuit 130. Particularly, the controller 140 divides one frame into the first subframe SF1 corresponding to a data addressing period and the second subframe SF2 and controls operation timing of the gate driving circuit 110, the data driving circuit 120 and the touch driving circuit 130. To achieve this, the controller 140 can multiply an input frequency twice or more. For example, if the input frequency is 60 Hz, the controller 140 can control the operation timing of the gate driving circuit 110, the data driving circuit 120 and the touch driving circuit 130 to be 120 Hz corresponding to twice the input frequency.

The controller 140 receives digital video data RGB and timing signals such as a vertical synchronization signal, a horizontal synchronization signal, a data enable signal, and a dot clock signal from an external system board. The controller 140 generates the source timing control signal DCS for controlling the operation timing of the data driving circuit 120 and the gate timing control signal GCS for controlling the operation timing of the gate driving circuit 110 on the basis of the digital video data RGB and the timing signals. The controller 140 supplies the digital video data RGB and the source timing control signal DCS to the data driving circuit 120. The controller 140 provides the gate timing control signal GCS to the gate driving circuit 110.

The controller 140 generates the touch timing control signal TCS for controlling operation timing of the Tx driving circuit 131, the Rx driving circuit 132 of the shield voltage supply circuit 133 of the touch driving circuit 130. The controller 140 supplies the touch timing control signal TCS to the touch driving circuit 130. The controller 140 receives touch raw data from the Rx driving circuit 132 and calculates touch data including touch coordinate information using a touch algorithm.

As described above, the present invention forms the shield pattern to which a predetermined voltage is supplied between each Tx electrode and each Rx electrode. As a result, the present invention can prevent liquid crystal electric field for driving sub-pixels overlapped on a Tx electrode and liquid crystal electric field for driving sub-pixels overlapped on an Rx electrode from being affected by a data voltage supplied through a data line. That is, the shield pattern prevents the data line and the Tx electrode or the Rx electrode from making an electric field therebetween. Accordingly, the present invention can prevent "black gray level light leakage" from being generated in sub-pixels formed at boundaries of Tx electrodes and Rx electrodes.

Although the embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display panel comprising:
    a pixel array including data lines through which a data voltage is supplied, gate lines through which a gate pulse is supplied, a plurality of sub-pixels arranged at intersections of the data lines and the gate lines, Tx lines provided with a touch driving signal and connected to Tx electrodes, and Rx lines connected to Rx electrodes,
    wherein a shield area including a shield pattern to which a voltage at a level different from the data voltage and the touch driving signal is supplied is formed between the Tx electrodes and the Rx electrodes, wherein the shield pattern is formed in parallel with the data lines on a plane different from a plane on which the data lines are formed and overlapped on the data lines.

2. The liquid crystal display panel of claim 1, wherein the shield pattern is insulated from the gate lines, the data lines, the sub-pixels, the Tx lines and the Rx lines.

3. The liquid crystal display panel of claim 1, wherein a common voltage is supplied to the shield pattern.

4. The liquid crystal display panel of claim 1, wherein the shield pattern has a width equal to or greater than a width of the data line.

5. The liquid crystal display panel of claim 1, wherein the shield area includes a gate insulating layer formed on a lower substrate, the data lines formed on the gate insulating layer, a first passivation layer formed on the data lines, the shield pattern formed on the first passivation layer, a second passivation layer formed on the shield pattern, and the Tx electrodes and Rx electrodes formed on the second passivation layer.

6. The liquid crystal display panel of claim 5, wherein the shield pattern and pixel electrodes of the sub-pixels are formed on the same plane.

7. The liquid crystal display panel of claim 5, wherein the shield pattern is formed on the same plane on which the Tx lines and the Rx lines are formed.

8. The liquid crystal display panel of claim 1, wherein the shield pattern is formed of a metal different from the gate lines and the data lines.

9. The liquid crystal display panel of claim 1, wherein the Tx lines and the Rx lines are formed in parallel with the data lines, and one of the Tx electrodes neighbors another Tx electrode in the direction of the data lines and neighbors one of the Rx electrodes in the direction of the gate lines.

10. The liquid crystal display panel of claim 9, wherein a common voltage is supplied to the Tx electrodes and the Rx electrodes during a first subframe, and the touch driving signal is supplied to the Tx electrodes and a touch sensor formed between each Tx electrode and each Rx electrode senses a touch during a second subframe.

11. The liquid crystal display panel of claim 1, wherein an auxiliary electrode to which the common voltage is supplied is formed between each Tx electrode and each Rx electrode.

12. The liquid crystal display panel of claim 11, wherein the shield area is formed between the Tx electrode and the auxiliary electrode and between the Rx electrode and the auxiliary electrode.

13. The liquid crystal display panel of claim 12, wherein each of the Tx electrode, the Rx electrode and the auxiliary electrode is overlapped on a plurality of sub-pixels.

14. A liquid crystal display comprising:

a liquid crystal display panel including a pixel array including data lines through which a data voltage is supplied, gate lines through which a gate pulse is supplied, a plurality of sub-pixels arranged at intersections of the data lines and the gate lines, Tx lines provided with a touch driving signal and connected to Tx electrodes, and Rx lines connected to Rx electrodes;

a data driving circuit configured to supply the data voltage to the data lines; and a gate driving circuit configured to sequentially supply the gate pulse to the gate lines, wherein a shield area including a shield pattern to which a voltage at a level different from the data voltage and the touch driving signal is supplied is formed between the Tx electrodes and the Rx electrodes; and wherein the shield pattern is formed in parallel with the data lines on a plane different from a plane on which the data lines are formed and overlapped on the data lines.

* * * * *